United States Patent [19]

Tsuchiya et al.

[11] Patent Number: 4,546,253

[45] Date of Patent: Oct. 8, 1985

[54] APPARATUS FOR PRODUCING SAMPLE IONS

[75] Inventors: Masahiko Tsuchiya, 4-37-27, Kugayama, Suginamiku, Tokyo, 186, Japan; Hirofumi Kuwabara, Tokyo, Japan

[73] Assignee: Masahiko Tsuchiya, Tokyo, Japan

[21] Appl. No.: 517,966

[22] Filed: Jul. 28, 1983

[30] Foreign Application Priority Data

Aug. 20, 1982 [JP] Japan ................................ 57-143254

[51] Int. Cl.[4] .............................................. B01D 44/00

[52] U.S. Cl. ................................ 250/288; 250/423 R; 250/281

[58] Field of Search ............... 250/423 R, 423 P, 288, 250/281, 282

[56] References Cited

U.S. PATENT DOCUMENTS

| | | | |
|---|---|---|---|
| 3,852,595 | 12/1974 | Aberth | 250/288 |
| 4,144,451 | 3/1979 | Kambara | 250/281 |
| 4,159,423 | 6/1979 | Kambara | 250/423 R |
| 4,300,044 | 11/1981 | Iribarne et al. | 250/282 |
| 4,367,429 | 1/1983 | Wang et al. | 250/423 R |

*Primary Examiner*—Bruce C. Anderson

*Attorney, Agent, or Firm*—Webb, Burden, Robinson & Webb

[57] ABSTRACT

Apparatus for producing sample ions comprising means of producing metastable species by corona discharges in the carrier gas, a needle-shaped emitter whose pointed end is inserted into the stream of carrier gas which transports said metastable species, means for applying a high potential to said needle emitter, wherein sample is arranged adjacent to or deposited on the pointed end of said emitter. Its value is further enhanced when it is combined with a mass spectrometer.

8 Claims, 8 Drawing Figures

APPARATUS FOR PRODUCING SAMPLE IONS

BACKGROUND OF THE INVENTION

The present invention relates to apparatus for producing sample ions, making it ideally suited for use with a mass spectrometer.

Prior to this invention, the present inventor had proposed a new apparatus and method for producing sample ions, both of which are fully disclosed in Japanese Patent Application No. 53-80960. A cross section of this apparatus is shown in FIG. 1.

As shown in FIG. 1, a carrier gas, such as Argon, is introduced into a glass tube 1 through a supply tube 2. One end of the glass tube 1 is closed by an insulating stopper 3, through which a needle-shaped electrode 4 is inserted into the glass tube 1. In said glass tube 1, a counter electrode 5, which is opposite the electrode 4, a mesh electrode 6, and a repeller electrode 7 are arranged in this order, between which insulating rings 8 and 9 are inserted. An emitter 10 is supported by an insulating base 11 and is inserted into the glass tube 1 through an opening in the side wall of the glass tube 1.

The method of using the apparatus shown in FIG. 1 comprised the following steps:

(a) by producing Argon ions ($Ar^+$), electrons ($e^-$) and excited Argon atoms (AR*: metastable species) by corona discharges between the needle electrode 4 and the counter electrode 5;

(b) by removing $Ar^+$ and $e^-$ by the electrodes 5 and 6; and (c) by ionizing a sample on the emitter 10 by the internal energy of AR*, said energy is transferred to the sample at the time that Ar* come into contact with the sample.

The following advantages can be realized with this method and apparatus:

(a) liquid samples can be directly ionized under atmospheric pressure;

(b) by using Argon as the carrier gas, most of the organic compounds can be ionized;

(c) since ionization is performed under atmospheric pressure, sample handling is easy; and (d) since a vacuous state is not essential, the structure of the apparatus can be simplified.

In case the proposed apparatus is combined with a mass spectrometer, it is necessary to generate a large quantity of sample ions and to effectively introduced them into the mass spectrometer. Therefore, the present inventor has tried to use an FD (Field Desorption) emitter which comprises a wire having a large number of whiskers, as the emitter 10. It is not possible, however, to fully satisfy such requirements.

SUMMARY OF THE INVENTION

The present invention relates to an improvement over the aforesaid apparatus and method, making it more suitable for use with a mass spectrometer.

According to one aspect of the invention, apparatus is provided for producing sample ions, comprising means for producing metastable species by corona discharge in carrier gas, a needle emitter whose pointed end is inserted into the stream of carrier gas which transports metastable species, and means for applying high potential to said needle emitter, wherein sample is arranged adjacent to (or deposited on) the pointed end of said needle emitter.

According to another aspect of the invention, apparatus is provided for producing metastable species, comprising, a cylindrical or barrel-shaped electrode with an open end, a needle electrode arranged in said cylindrical electrode so that the pointed end of said needle electrode is directed to the open end of said cylindrical electrode, means for supplying carrier gas in said cylindrical electrode, whereby the gas flows from said needle electrode to the open end of said cylindrical electrode, and means for applying a high potential between said electrodes in order to generate corona discharges.

DESCRIPTION OF THE PREFERRED EMBODIMENTS

Figure 1:
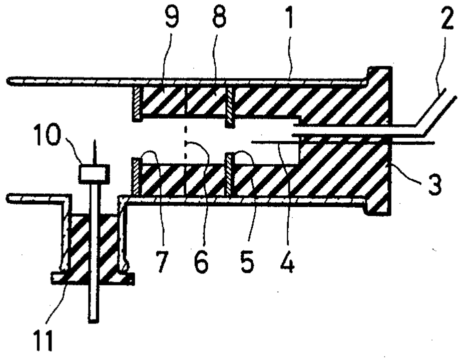
FIG. 1 is a diagram of a prior art.
Figure 2:
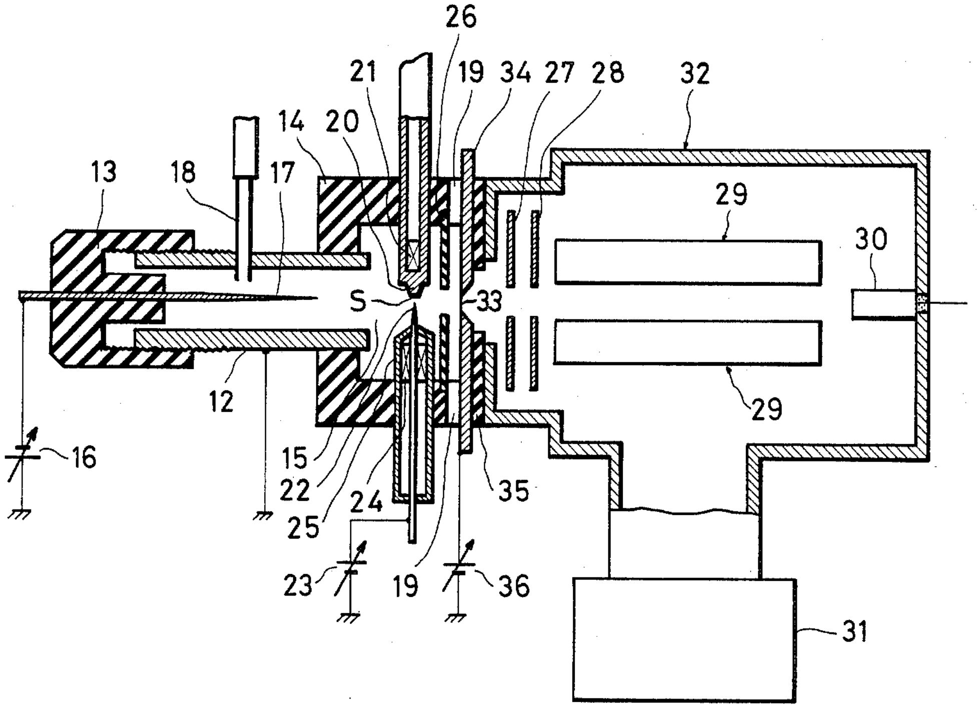
FIG. 2 is a cross section of one embodiment of the invention.

Referring now to FIG. 2, a cylindrical or barrel-shaped electrode 12 has a ground potential. One end of it is sealed by an insulating cap 13 and the other end is inserted into an ionization chamber 15 which is walled in by an insulating ring 14. A needle electrode 17 connected to a voltage source 16, is inserted into said electrode 12 through the insulating cap 13 and is movable back and forth by rotating the insulating cap 13. A carrier gas such as Argon, having atmospheric pressure, is introduced into said electrode 12 through an inlet tube 18, flows into the ionization chamber 15 and is exhausted from the chamber 15 through the outlet holes 19 bored in the insulating ring 14.

A sample holder 20 having a heater 21 is inserted into the ionization chamber 15, and lower surface S of the holder 20 reaches the stream of the carrier gas. On surface S of the holder 20, a sample as a solution or mixed with a matrix such as glycerol (G) is applied. From the direction opposite the holder 20, a needle-shaped emitter 22 is inserted into the ionization chamber 15. The pointed end of the emitter 22 contacts the sample on the holder 20 and a high potential is applied to the emitter 22 from a voltage source 23. The emitter 22 can be heated by a surrounding heater 24, and the base part of it is sheathed with an insulating cover 25 together with the heater 24. Beyond the insulating ring 14, a mass spectrometer 32, having lens electrodes 27 and 28, quadrupole electrodes 29, an ion detector 30 and a vacuum pump 31, is attached. A pinhole aperture 34 with a pinhole 33 is employed to enable the difference in pressure between the ionization chamber 15 (atmospheric pressure) and the mass spectrometer 32 (high vacuum) to be maintained. The apertured plate 34 is isolated from the surroundings by the insulating ring 14 and 35, and a suitable potential (15 V–20 V) is applied from a voltage source 36. An insulating plate 26 having an ion penetration hole is arranged between the holder 20 and the aperture 34.

In the above described arrangement, a carrier gas, such as Argon, is introduced into the cylindrical electrode 12 through the inlet tube 18 and flows into the ionization chamber 15. Passing through the holder 20 and the needle emitter 22, the Argon reaches the apertured plate 34, flows to the outlet holes 19, and is exhausted from the ionization chamber 15. A part of the Argon flows into the mass spectrometer 32 through the pinhole 33.

Now, by applying a negative high potential, for example, ranging from $-1$ to $-2$ KV, to the needle electrode 17, a corona discharge is continuously generated between the pointed end of the electrode 17 and the cylindrical electrode 12. By said discharge, $Ar^+$, $e^-$, and $Ar^*$ which is uncharged, are generated around the pointed end of the electrode 17. Said $Ar^*$ species is in a metastable state (internal energies: 11.55 eV and 11.72 eV) and is long-lived ($10^{-3}$ sec or more).

$Ar^+$, $e^-$, and $Ar^*$, generated by the corona discharge, are transported by the stream of Argon gas toward the ionization chamber 15; however, $Ar^+$ and $e^-$, both charged, are attracted to the surrounding electrode 12 and removed. As a result, at the open end of the cylindrical electrode 12, only $Ar^*$ still exist in the carrier gas. Said $Ar^*$ is further transported and reaches the needle emitter 22 to which a sufficiently high potential, such as several hundred volts to over one thousand volts, is applied.

When said $Ar^*$ collides or contacts sample M (on top of emitter 22), then sample M, whose ionization energy is less than the internal energy of $Ar^*$ (11.55 eV or 11.72 eV) is ionized according to the following reaction formulas.

$$Ar^*+M \rightarrow Ar+M^++e^- \quad (1)$$

$$M^++M \rightarrow (M+H)^++(M-H) \quad (2)$$

$$Ar^*+nM \rightarrow (kM+H)^++(mM-H)^-+(n-k-m)M+Ar \quad (3)$$

A part of $Ar^*$ is changed to $Ar^+$ by the intense electric field around the pointed end of the emitter 22. Said $Ar^+$ has a sufficiently high energy (15.5 eV) to ionize the water molecules which ordinarily exists in the carrier gas and the ionization chamber 15, or to ionize matrix G. Then, cluster ions of water $(H_2O)nH^+$ or $GmH^+$ ions are produced and a part of sample is ionized by the proton transfer reaction with said ions according to the following reaction formulas:

$$Ar^*+nG \rightarrow GmH^+(n-m-1)G(G-H)+Ar \quad (4)$$

$$GmH^++M \rightarrow MH^++mG \quad (5)$$

$$Ar^++H_2O \rightarrow H_2O^++Ar \quad (6)$$

$$H_2O^++H_2O \rightarrow (H_2O)H^++OH \quad (7)$$

$$(H_2O)H^++H_2O+Ar \rightarrow (H_2O)_2H^++Ar \quad (8)$$

$$(H_2O)_{n-1}H^++H_2O+Ar \rightarrow (H_2O)nH^++Ar \quad (9)$$

$$(H_2O)nH^++M \rightarrow MH^++nH_2O \quad (10)$$

Sample ions, produced by the above reactions, can be desorbed from the sample surface soon after their ionization by the intense electric field around the pointed end of the needle emitter 22 and directed toward the pinhole 33 by the convex lens action of the electric field, and are introduced into the mass spectrometer 32 through the pinhole.

As a result, since sample ions are effectively desorbed from the emitter by the intense electric field, a large quantity of sample ions can be produced. Furthermore, since the sample is ionized in the restricted area, namely, at the pointed end of the emitter 22, it is very easy to find an optimum position for the best transmission of ions produced in said restricted area through the pinhole 33.

When the needle electrode 17 is moved forward and the pointed end of it is close to the open end of the cylindrical electrode 12, $Ar^+$ produced in the electrode 12 is not effectively removed and a considerable amount of $Ar^+$ is introduced into the ionization chamber 15. Accordingly, it is possible to mainly ionize the sample by aforesaid proton transfer reactions ((6)−(10)) due to said $Ar^+$.

In the case of nonvolatile samples, it is possible to increase the quantity of the sample ions by heating the emitter 22, thereby heating the sample around it. Heating can be done by the heater 21 through the holder 20 or by both heaters 21 and 24.

However, in the case of volatile samples, heating and/or matrix is not required.

The holder 20 and/or the emitter 22 has a shifting and tilting mechanism in order to vary the distance and angle between the holder and emitter.

Figure 3:
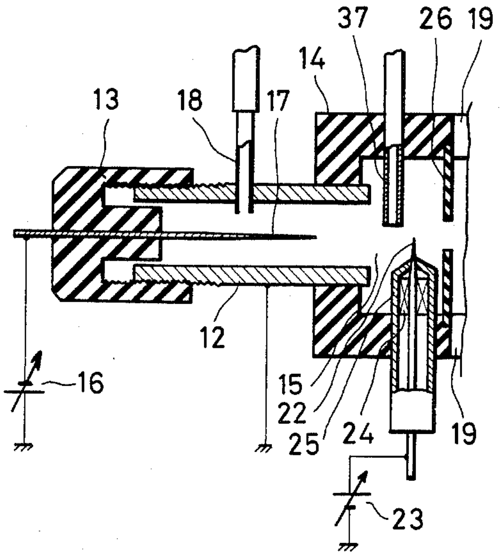
FIG. 3 is a cross section of another embodiment of the invention.

FIG. 3 shows another embodiment suitable for ionizing the gaseous sample. In the figure, an inlet pipe 37 is inserted into the ionization chamber 15. The gaseous sample introduced into said chamber 15 through the inlet pipe 37 reaches the pointed end of the emitter 22 and is ionized by $Ar^*$ (or cluster ions of water) in accordance with the same procedure described above. A gas chromatograph mass spectrometer (GC-MS) can be realized by connecting the inlet pipe 37 to the output of a gas chromatograph.

Figure 4:
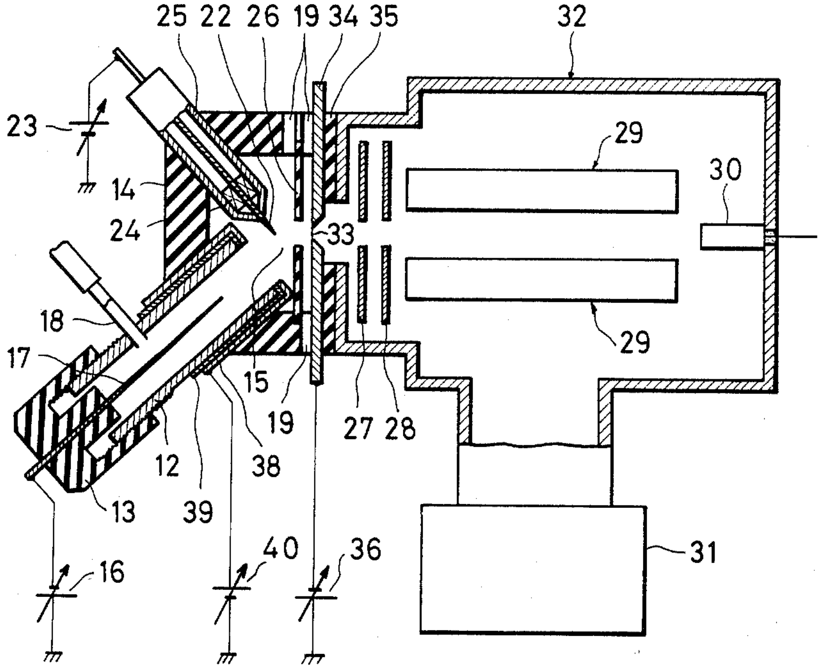
FIG. 4 is a cross section of still another embodiment of the invention.

According to the present invention, liquid samples and samples mixed in the liquid matrix, such as liquid paraffin, can be also ionized. FIG. 4 shows another embodiment which is suitable in this case. In the figure, the liquid sample or the sample mixed in the liquid matrix is deposited on the pointed end of the emitter 22 by a microsyringe or other device (not shown), which is inserted into the chamber 15 at a right angle or from a suitable angle to the drawing.

In this embodiment, a ring electrode 38 is attached to the open end of the cylindrical electrode 12, between which an insulator 39 is inserted. An appropriate positive potential is applied to said electrode 38 from a voltage source 40. Since the electrode 38 works as a repeller, $Ar^+$ and background ions produced in the cylindrical electrode 12 can be significantly reduced. Said ring electrode 38 can be adopted in the other embodiments of the invention.

Figure 5B:
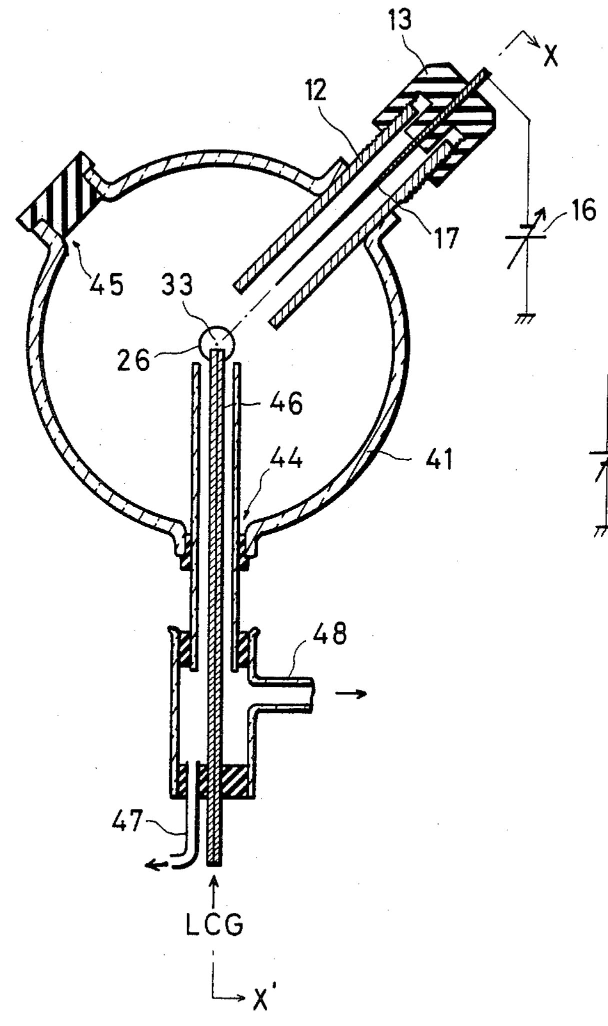
FIGS. 5A, 5B, 5C and 5D are cross sections of still another embodiment of the invention.
Figure 5A:
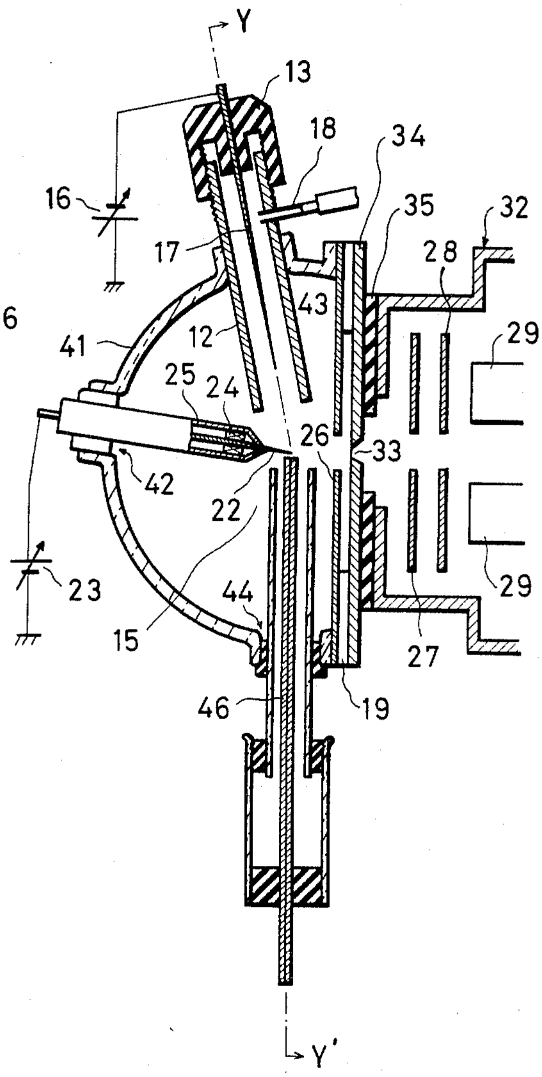

FIGS. 5A and 5B show another embodiment suitable for ionizing the liquid sample from a liquid chromatograph. FIG. 5A is an X—X' cross section of FIG. 5B and FIG. 5B is a Y—Y' cross section of FIG. 5A. In the figures, the ionization chamber 15 is walled in by a glass dome 41 which corresponds to the insulating ring 14 in FIGS. 2 to 4. Said dome 41 has a top opening 42 and side openings 43, 44 and 45 of the same size. The needle emitter 22 is inserted through the top opening 42 from a suitable angle with the ion path passing through the pinhole 33, and the pointed end of the emitter 22 is arranged opposite to the pinhole 33. The cylindrical electrode 12 is inserted into the chamber 15 through the side opening 43 so as to aim at the pointed end of the emitter 22. An inlet pipe 46 which is connected to the output of a liquid chromatograph (not shown) is inserted into the chamber 15 through the side opening 44 so as to deposit liquid sample from the liquid chromatograph on the pointed end of the emitter 22. Sample overflows run down along the outside wall of the inlet pipe 46 and are drawn off through a drain pipe 47. Argon gas in the ionization chamber 15 is exhausted through an exhaust pipe 48.

Figure 5C:
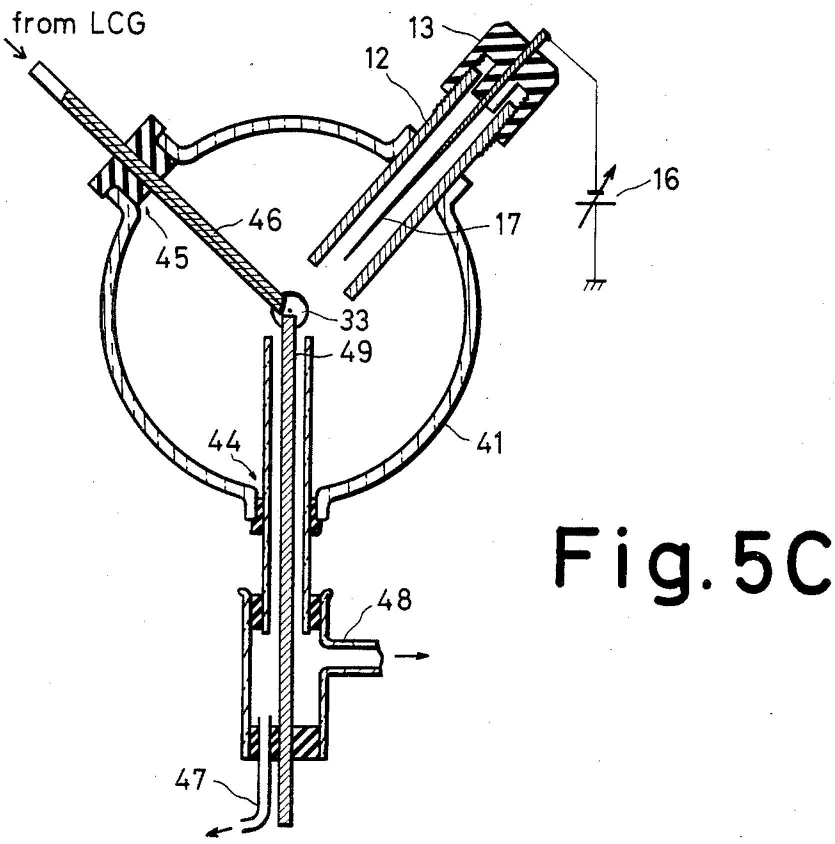

By changing the inlet pipe 46 for a sample receiver 49 and inserting said inlet pipe 46 into the chamber 15 through the side opening 45 as shown in FIG. 5C, it is also possible to ionize the sample from the liquid chromatograph. The sample receiver 49 is composed of an insulating rod and is used for assisting to deposit the sample on the emitter 22.

Figure 5D:
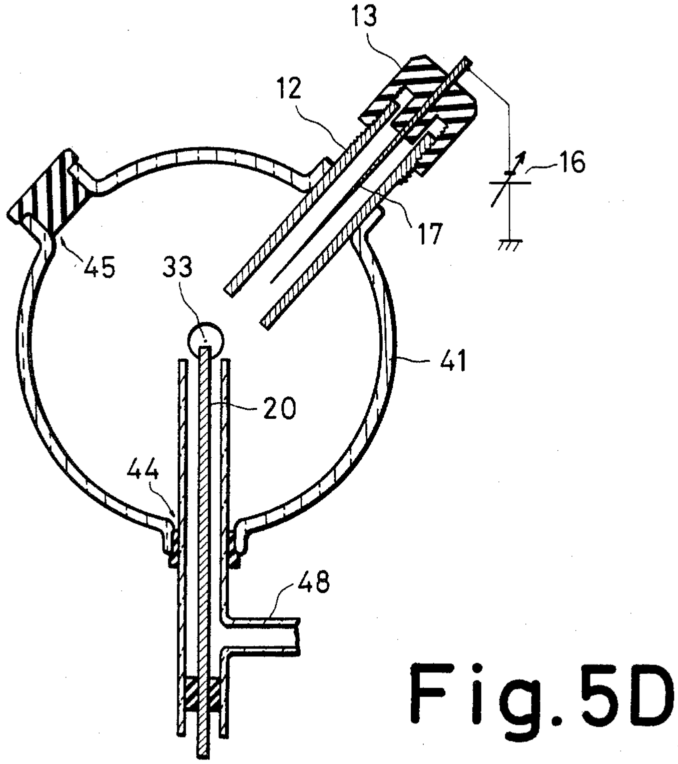

Furthermore, by changing the receiver 49 for the sample holder 20 and removing the inlet pipe 46 as shown in FIG. 5D, it is possible to ionize sample on top of the holder 20. In this case, the sample can be deposited on the holder 20 by a microsyringe or other device inserted through the side opening 45, which the operator can observe through the glass dome 41.

In the aforesaid embodiments, positive sample ions are extracted. To obtain negative sample ions, it is necessary to invert the polarity of every voltage source, except the voltage source 16.

To summarize, with the present invention, the sample is effectively ionized in the restricted area of the pointed end of the emitter 22, and high density of sample ions can be obtained. Moreover, it is possible to effectively converge the sample ions from said restricted area through the pinhole 33. Accordingly, a large quantity of sample ions (10 to 100 times that of the previously proposed method and apparatus) can be introduced into the mass spectrometer.

Having thus described the invention with the detail and particularity required by the Patent Laws, what is desired protected by Letters Patent is set forth in the following claims.

We claim:

1. An apparatus for producing sample ions from a specimen comprising:

(a) means for supporting the specimen;

(b) a needle-shaped emitter, the pointed end of which is arranged adjacent the specimen;

(c) means for applying a high potential to the emitter;

(d) means for producing a metastable but nonionized species by corona discharge in a carrier gas; and (e) means for directing the carrier gas with the metastable species to the specimen whereby the specimen, on contact with the metastable species, together with the emitter at high potential, produces a large quantity of sample ions.

2. Apparatus as claimed in claim 1, further comprising means for heating said needle-shaped emitter.

3. Apparatus as claimed in claims 1 to 2, wherein said sample is deposited on the pointed end of the needle-shaped emitter.

4. Apparatus as claimed in claims 1 to 2, further comprising means for carrying gaseous sample to the pointed end of the needle-shaped emitter.

5. Apparatus as claimed in claims 1 to 2, further comprising a sample holder for arranging the sample adjacent to the pointed end of the needle-shaped emitter.

6. Apparatus as claimed in claim 5, further comprising a liquid chromatograph and means for transporting the output of said liquid chromatograph to the sample holder.

7. Apparatus as claimed in claim 6, further comprising means for heating said sample holder and means for varying the distance and angle between said holder and the needle-shaped emitter.

8. Apparatus as claimed in claim 1, further comprising a mass spectrometer for analyzing sample ions; and a pinhole aperture for introducing sample ions into said mass spectrometer.

* * * * *